United States Patent Office 2,745,878
Patented May 15, 1956

2,745,878

PREPARATION OF AROMATIC THIO ETHERS

Julian M. Mavity, Hinsdale, Ill., assignor to Universal Oil Products Company, Chicago, Ill., a corporation of Delaware No Drawing. Application June 30, 1952,
Serial No. 296,489

8 Claims. (Cl. 260—609)

This invention relates to a process for preparing aromatic thioalkyl and thioaryl ethers. More specifically, the invention concerns the preparation of thioalkyl and thioaryl ethers of phenolic compounds by the reaction of said phenolic compounds with a mercaptan.

In one of its embodiments the present invention relates to an etherification process in which a nuclearly hydroxy substituted aromatic compound is reacted with an alkylating or arylating agent in the presence of an etherification catalyst at condensation reaction conditions.

A more specific embodiment of the invention concerns a process for thioetherifying a nuclearly hydroxy substituted aromatic compound with a mercaptan in the presence of an etherification catalyst at condensation reaction conditions.

A still more specific embodiment of this invention resides in the process of preparing a thiomethyl ether of hydroquinone by reacting hydroquinone with methyl mercaptan in the presence of an etherification catalyst at condensation reaction conditions.

Other objects and embodiments of the invention referring to alternative reactants utilizable as charging stocks in the present process and to alternative catalysts within the scope of the invention will be referred to in greater detail in the following further description of the invention.

It has now been discovered that a nuclearly hydroxy substituted aromatic compound will react with an alkyl or aryl mercaptan in the presence of an etherification catalyst to produce an unexpected result, namely an aromatic thioalkyl or thioaryl ether instead of an aromatic ether such as p-alkoxyphenol. This reaction occurs due to the fact that the alkyl group tends to remain attached to the sulfur so that S-alkyl or S-aryl rather than O-alkyl or O-aryl derivatives are obtained.

The nuclearly hydroxy substituted aromatic compounds utilizable in the present process as starting materials for the production of thioethers include phenol, the alkyl substituted phenols, such as cresols, xylenols, etc.; the dihydric phenols, such as hydroquinone, catechol, resorcinol; the trihydric phenols, such as pyrogallol and phloroglucinol; the alkoxy ethers of the benzenoid phenols, such as guaiacol, hydroquinone mono-methyl ether and other aromatic-alkyl ethers containing at least one free hydroxyl group per molecule; alpha and beta naphthols, the various isomeric anthrols; the mono- and polyhydroxy diphenyls such as p,p'-dihydroxy-diphenyl and a large number of homologous and analogous compounds.

The thio-alkylation agents used in this invention are selected from the group consisting of methyl mercaptan, ethyl mercaptan, propyl mercaptan, butyl mercaptan, etc., while the thioarylation agents are selected from the group consisting of thiophenol, dithioresorcinal, dithiohydroquinone and the like.

In another embodiment of the invention dialkyl or diaryl sufides such as dimethyl sulfide or diphenyl sulfide may be used as the etherification agent, but not necessarily with equivalent results.

It has now been discovered that acidic compounds, particularly the strong mineral acids, acid-acting inorganic metal halides, composites of acids on siliceous solid adsorbents and acid metallic oxide compositions are unusually effective to catalyze this etherification reaction of organic hydroxy compounds. Thus, alkylation effecting mineral acids, such as sulfuric acid, phosphoric acid, pyrophosphoric acid, hydrofluoric acid, etc., acid-acting salts such as aluminum chloride, ferric chloride, zirconium trichloride, boron trifluoride, etc., composites of acids and solid siliceous adsorbents such as pyrophosphoric acid on siliceous solid adsorbent, etc., acid metallic oxide compositions such as silica-alumina, silica-zirconia, silica-alumina-zirconia, silica-magnesia, silica-alumina-magnesia, alumina-boria, mixtures of synthetic and natural occurring acid metallic oxide compositions, and others may be utilized as catalysts for effecting thio-etherification of organic hydroxy compounds.

The reaction between the aromatic compound and the thioetherification agent is carried out at elevated temperatures and superatmospheric pressures, the particular temperature and pressure required being dependent upon the type of catalyst utilized in the reaction.

For example, the reaction between a nuclearly hydroxy substituted aromatic compound and an alkyl mercaptan is carried out at temperatures ranging from about 400° F. to 700° F. or more and preferably at superatmospheric pressures in the presence of metallic oxide composition such as silica-alumina, silica-zirconia, etc. Likewise the aforesaid reaction may be carried out at a temperature ranging from about 300° F. to about 600° F. and preferably at superatmospheric pressures in the presence of a composite known in the industry as solid phosphoric acid which is a composite of phosphoric acid and kieselguhr. When the thioetherification catalyst utilized comprises an acid-acting inorganic metal halide such as aluminum chloride or an alkylation effecting mineral acid such as sulfuric acid, lower temperatures, i. e. from atmospheric or below to about 300° F., are employed.

One method of preparing aromatic thioethers is to react a phenolic compound with an alkyl mercaptan in the presence of a silica-alumina catalyst at an elevated temperature. The reactants are placed in a bomb under superatmospheric pressures and heated and maintained at the desired temperature for a predetermined length of time, after which time the bomb is cooled to room temperature and opened. The contents of the bomb, less the gases previously discharged, are distilled, and the residue from said distillation is extracted with benzene. The residue from this extraction is subjected to fractionation, and the thioalkyl ether of the phenolic compound is separately recovered.

The present invention is further illustrated with respect to specific embodiments thereof in the following examples, which, however, are not intended to limit the generally broad scope of the present invention in strict accordance therewith.

Example 1

54.7 grams of hydroquinone, 47.7 grams of methyl mercaptan, 20 grams of a synthetic silica-alumina catalyst containing about 13% alumina and the remainder silica, and 20.1 grams of a natural occurring silica-alumina catalyst were heated in a glass liner in a rotating bomb under 15 atmospheres of added nitrogen for 3 hours at 464° F. The bomb was cooled to room temperature and the products separated, the gases being collected in a Dry Ice trap.

Approximately 117 grams of material remained in the liner and the bomb, while approximately 13 grams of material was collected in the trap. The trap contents were found to distill at a constant temperature of 42.8° F. (methyl mercaptan). In addition to the listed products, considerable black scale, presumably metal sulfides, was found, particularly around the copper gasket of the bomb. The bulk of this amounted to about 2 grams. The bomb and liner contents were subjected to direct distillation from the liner through a 24-inch wire spiral column.

The residue from the above distillation was extracted repeatedly with benzene at room temperature leaving 68.9 grams of insoluble material (catalyst, unreacted hydroquinone, etc.). The bulk of the benzene was distilled from the extract and the residue (32.77 g.) was subjected to vacuum fractionation in an eight-inch wire spiral type of column.

The fractionation of the residue was divided into seven separate cuts according to temperature. The cut temperature of cut No. 1 was 194° F., No. 1a was 212° F., No. 2 was 253° F., No. 3 was 284° F., No. 4 was 320° F., No. 5 was 329° F. and No. 6 was 356° F. It was noted during the distillation that practically no distillate was obtained in the p-methoxyphenol range (ca. 284–293° F./20 mm.). A plateau was observed at about 320±9° F./20 mm. (material of cuts 4 and 5).

A sample of cut 5 was separated into 2 parts by treatment with 10% potassium hydroxide. The alkali insoluble portion, recovered by ether extraction, represented 36% of cut 5; and the alkali soluble portion, recovered by acidification plus ether extraction represented 64% of cut 5. A fractional crystallization of each portion produced crystals which were subjected to melting point determinations. The results of these determinations established the presence of p-methylmercaptophenol and p-dimethylmercaptobenzene.

*Example II*

Hydroquinone may be reacted with methyl mercaptan in the presence of a catalyst comprising a silica-magnesia composition under conditions similar to those disclosed in Example I. The presence of p-methylmercaptophenol and p-dimethylmercaptobenzene in the residue may be determined by distillation and fractionation, followed by crystallization as shown in the preceding example.

*Example III*

Hydroquinone may be reacted with ethyl mercaptan in the presence of sulfuric acid under conditions similar to those present in Example I. However, the temperature under which this reaction proceeds will be under 300° F. The residue in the liner and bomb may be extracted from the catalyst, distilled and fractionated, and the crystals of p-ethylmercaptophenol and p-diethylmercaptobenzene extracted in like manner.

*Example IV*

Resorcinol may be reacted with methyl mercaptan in the presence of a catalyst such as solid phosphoric acid at temperatures ranging between 300° F. and 600° F. and under superatmospheric pressures, said reaction taking place in a rotating bomb. The residue may be distilled and fractionated in a manner similar to that expressed in Example I. Following the procedure set forth in Example I, crystals of m-methylmercaptophenol and m-dimethylmercaptobenzene can be procured by purification and distillation.

*Example V*

Catechol may be reacted with thiophenol in the presence of aluminum chloride at a temperature below 300° F., the remaining conditions being similar to those disclosed in Example I. Crystals of o-phenylmercaptophenol may be obtained in the usual manner after distillation and fractionation of the residue of the primary reaction.

I claim as my invention:

1. A process for the preparation of an aromatic thioether which comprises condensing an unsubstituted polyhydric phenol in the presence of a thioetherification catalyst with a compound consisting of carbon, hydrogen and sulfur and selected from the group consisting of alkyl and aryl mercaptans and dialkyl and diaryl sulfides.

2. A process for the preparation of an aromatic thioether which comprises condensing hydroquinone in the presence of a thioetherification catalyst with a compound consisting of carbon, hydrogen and sulfur and selected from the group consisting of alkyl and aryl mercaptans and dialkyl and diaryl sulfides.

3. A process for the preparation of an aromatic thioether which comprises condensing hydroquinone with methyl mercaptan in the presence of a thioetherification catalyst.

4. A process for the preparation of an aromatic thioether which comprises condensing hydroquinone with an aromatic mercaptan in the presence of a thioetherification catalyst.

5. A process for the preparation of an aromatic thioether which comprises condensing an unsubstituted polyhydric phenol with a mercaptan in the presence of an acid-acting catalyst.

6. A process for the preparation of an aromatic thioether which comprises condensing hydroquinone in the presence of an acid-acting catalyst with a compound consisting of carbon, hydrogen and sulfur and selected from the group consisting of alkyl and aryl mercaptans and dialkyl and diaryl sulfides.

7. A process for the preparation of an aromatic thioether which comprises condensing hydroquinone with methyl mercaptan in the presence of an acid-acting catalyst.

8. A process for the preparation of an aromatic thioether which comprises condensing hydroquinone with dimethyl sulfide in the presence of an acid-acting catalyst.

References Cited in the file of this patent

UNITED STATES PATENTS

| | | |
|---|---|---|
| 2,116,182 | Baur | May 3, 1938 |
| 2,519,586 | McCaulay et al. | Aug. 22, 1950 |
| 2,531,602 | Bell | Nov. 28, 1950 |
| 2,565,195 | Bell | Aug. 21, 1951 |
| 2,625,534 | Thompson | Jan. 13, 1953 |
| 2,668,768 | Chenicek | Feb. 9, 1954 |
| 2,691,686 | Bloch | Oct. 12, 1954 |

OTHER REFERENCES

J. A. Chemical Society, vol. 69, pages 712–713 (1947).